United States Patent [19]
Gandrud

[11] 3,761,842
[45] Sept. 25, 1973

[54] TWISTED PAIR FLAT CONDUCTOR CABLE WITH MEANS TO EQUALIZE IMPEDANCE AND PROPAGATION VELOCITY

[75] Inventor: William Bentley Gandrud, Madison, N.J.

[73] Assignee: Bell Telephone Laboratories, Incorporated, Murray Hill, N.J.

[22] Filed: June 1, 1972

[21] Appl. No.: 258,530

[52] U.S. Cl. .......................... 333/1, 174/34, 333/33, 333/84 R
[51] Int. Cl. .......................... H01p 3/02
[58] Field of Search .......................... 333/1, 24 C, 33, 333/84 R; 317/101 CE; 174/117 F, 117 FF, 34

[56] References Cited

UNITED STATES PATENTS

| | | | |
|---|---|---|---|
| 1,792,273 | 2/1931 | Byk et al. | 174/34 |
| 3,104,363 | 9/1963 | Butler | 333/84 R |

*Primary Examiner*—Paul L. Gensler
*Attorney*—W. L. Keefauver

[57] ABSTRACT

The use of so-called paired flat cable in interconnection work is attractive because of mass termination and rearrangement cost benefits. Flat cable has been supplied with differing twist lengths to meet crosstalk problems, but present such designs also exhibit an unacceptable difference from pair to pair of characteristic impedance and propagation velocity.

The present invention eliminates these differences by recognizing that the capacitance at each crossover point of a twisted pair can be controlled by making a crossover smaller in area for pairs with shorter twist lengths and larger for those with longer twist lengths. The capacitance per unit length and, by the same mechanism, the impedance and propagation velocities are thus equalized among the pairs of the flat cable.

6 Claims, 6 Drawing Figures

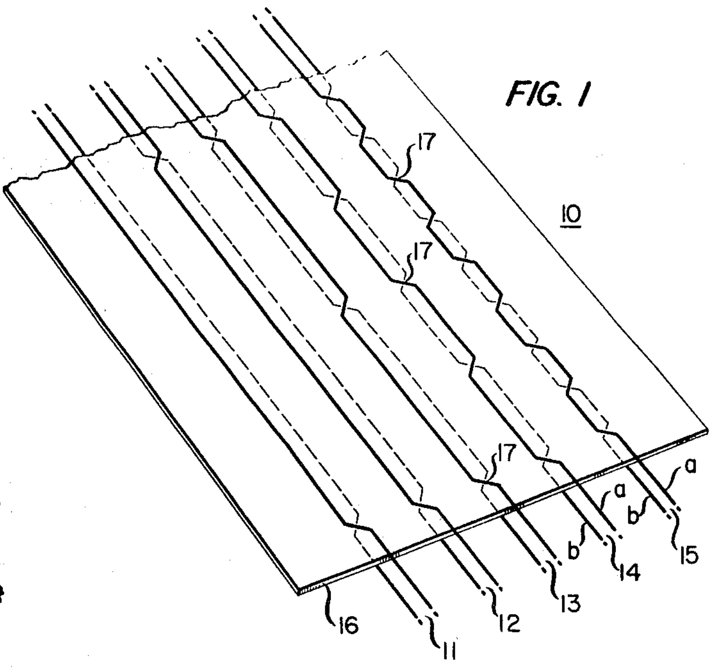
FIG. 1
FIG. 3A
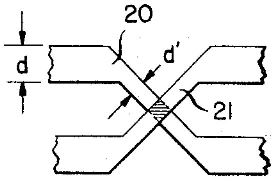
FIG. 2
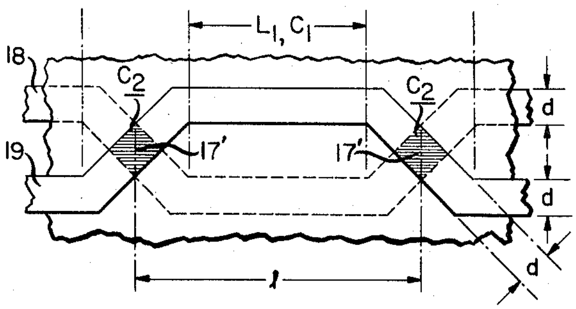
FIG. 3B
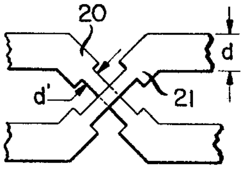
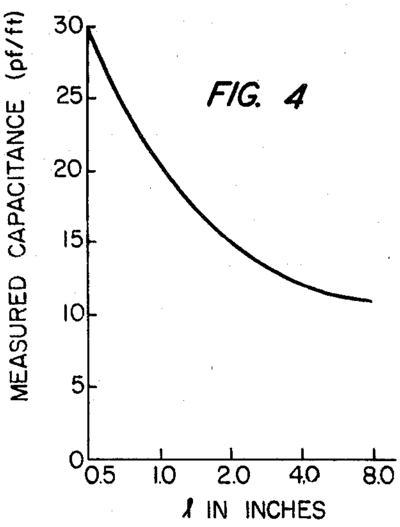
FIG. 4
FIG. 5
TABLE I: VARYING PATH WIDTH d TO COMPENSATE FOR TWIST LENGTH l.
| l | d |
|---|---|
| 8" | .050" |
| 4" | .050"/$\sqrt{2}$= .035" |
| 2" | .035"/$\sqrt{2}$= .025" |
| 1" | .025"/$\sqrt{2}$= .018 |
| 1/2" | .018"/$\sqrt{2}$= .012 |

TWISTED PAIR FLAT CONDUCTOR CABLE WITH MEANS TO EQUALIZE IMPEDANCE AND PROPAGATION VELOCITY

FIELD OF THE INVENTION

This invention relates to interconnection technology and specifically to so-called flat conductor cable.

BACKGROUND OF THE INVENTION

In the field of interconnection, which largely involves massive wired connection among numerous subassemblies of complex electronic gear such as computers, etc., the concept of flat cable has recently received much attention because of its mass termination and rearrangement cost benefit. Mass terminations also result in fewer wiring errors which is an important consideration for such complex systems.

The problem of crosstalk between adjacent paths of flat cable has been recognized. One solution is to place conductors of a given pair on opposite sides of the insulative circuit carrier, with their paths slightly and oppositely offset with respect to a common nominal path locator. The offsets are periodically reversed, thus to achieve what has been called a "pseudo-twist"; and the twist lengths as between adjacent pairs are selected to minimize crosstalk.

Use of different twist lengths in a pseudo-twisted multipair flat conductor cable normally causes the characteristic impedance and propagation velocity to differ from pair to pair. The remedy for this situation is not found by reference to conventional continuously twisted pair art because of the peculiarities of flat conductor and the non-helical twists of the pseudotwist structure.

Accordingly, the principal object of the invention is to make the characteristic impedance and propagation velocity independent of twist length in a flat type cable.

An important related inventive object is to achieve the foregoing inexpensively and with existing manufacturing methods and equipment.

SUMMARY OF THE INVENTION

The foregoing and further objects are achieved pursuant to the invention by recognizing that the capacitance associated with each crossover point of each twisted pair can be varied, i.e., controlled so as to equalize the characteristic impedance and propagation velocity for all pairs. Essentially, the control involves making the crossover region smaller for shorter twist lengths and longer for longer twist lengths. Thus for each pair the mutual capacitance per unit length is not determined by the twist length of that pair.

The invention and its further objects, features, and advantages will be more readily understood by reference to the detailed description to follow of an illustrative embodiment.

THE DRAWING

FIG. 1 is a schematic perspective sketch of flat cable with different twist lengths;

FIG. 2 is a schematic top view of crossover points between conductors of a given pair in such a cable;

FIGS. 3A and 3B illustrate crossover points sized with respect to FIG. 2 to reflect the present invention;

FIG. 4 is a graph showing the relationship between capacitance per unit length vs. twist length; and FIG. 5 is a table denoted "I."

DETAILED DESCRIPTION OF ILLUSTRATIVE EMBODIMENT

FIG. 1 shows a flat cable designated 10, with "pseudotwisted" pairs 11–15. The two conductive paths which make up each pair are denoted *a* and *b* in each case. The *a* paths are all disposed on one side of a flexible insulative medium 16, and the *b* paths are disposed on the opposite side of medium 16. Crossover regions denoted 17 occur along each pair 11–15. Each pair is given a different twist length with the ratio selected to minimize crosstalk between adjacent pairs. These different twist lengths are achieved by causing the paths to undergo juxtaposition reversals of differing periodicity from pair to pair. Except for the space in which the reversals occur, the paths of each pair and all pairs are generally parallel.

FIG. 2 depicts a generalized pseudotwisted pair with a twist length generally denoted $l$ defined as the distance between centers of two adjacent crossovers. The two conductor paths 18, 19 which make up the pair are applied by any of various conventional methods to opposite sides of insulative medium 16. The two crossover areas shown as 17' are regions of overlap between the paths 18, 19.

At frequencies in the megahertz region, the characteristic impedance $Z_o$ and the propagation velocity $\mu$ of any given line are given, respectively by:

$$Z_o = \sqrt{L/C} \tag{1}$$

and $$\mu = \sqrt{1/L\,C} \tag{2}$$

where $L$ and $C$ in both equations are the inductance per unit length and the capacitance per unit length, respectively.

For pseudotwisted flat cable such as shown in FIGS. 1 and 2, $Z_o$ and $\mu$ are additionally functions of the twist length 1. This is because of the lumped capacitance denoted $C_2$ associated with the crossover areas 17'. To a first approximation:

$$C_2 \ \alpha \ d^2 \tag{3}$$

where $d$ is the lateral width of the conductive paths as shown in FIG. 2.

FIG. 4 plots the measured capacitance in picofarads per foot for differing values of twist length $l$ for a pseudotwisted pair having a fixed path width $d$. However, it will be recognized that the per-unit length inductance $L_1$ and capacitance $C_1$ of the pair in FIG. 2 are approximately independent of path width $d$. Further, decreasing the twist length by a factor of two, for example, increases the contribution of the capacitances $C_2$ also by a factor of two.

This can be exactly compensated for by reducing the path width $d$ by a factor of $\sqrt{2}$ in the above example. It follows that $Z_o$ and $\mu$ are then rendered independent of the twist length $l$. In general, the crossover area 17' is made smaller for shorter twist lengths and longer for greater twist lengths.

Table I of FIG. 5 of the drawing illustrates by way of example how the path width $d$ may be varied to compensate for different twist lengths so that all pseudotwist pairs of a given cable will exhibit the same characteristic impedance $Z_0$ and propagation velocity $\mu$. It has been found that a variation of from ½ inch to 8 inches in the twist length $l$ occasions a change in the unit length inductance L of less than 10 percent, hence making it possible to concentrate solely on control of the contributions of the crossover area capacitances $C_2$ in achieving the desired objects of this invention.

FIGS. 3A and 3B depict two specific approaches to varying the crossover area in practice. In FIG. 3A the necessary reduction in the path width $d$ to a value $d'$ is made, and the crossover legs 20,21 are maintained at the width $d'$ until an intersection is effected with the main circuit paths of width $d$. In FIG. 3B, the width of the crossover legs 20, 21 are held at the same width $d$ as that of the main circuit paths until approach to the crossover area is made; then the path width is abruptly reduced to a value $d'$. Other expedients can readily be envisioned that will achieve the required reduction in path width at the crossover point so as to reduce the crossover area, and hence the capacitances $C_2$ to realize the inventive ends.

In manufacturing flat cable pursuant to the present invention, all of the pair paths may advantageously be constructed with substantially the same standard width along the parallel portions. Then, the crossover regions of all but one of the cable pairs are constructed using path widths less than the standard width by an amount dependent on the juxtaposition reversal periodicity of the given pair.

For high pair count flat cables, with a large number of twist lengths, it may be desirable to supply some crossover areas which are greater than can be made with the standard path width, as well as having crossover areas reduced from the standard path width, to avoid potential problems incident to very small crossover areas.

The invention has been described largely in its use with a flexible insulative medium which may, for example, be Mylar or the like with copper conductor paths made using either metal deposition or etching techniques. It is obvious that the invention is applicable to multipair configurations produced on inflexible media as well, however.

The spirit of the invention is embraced in the scope of the claims to follow.

I claim:

1. In a communications cable comprising a plurality of pairs of conductive paths, unitary insulative means for holding the paths of each said pair in closely spaced juxtaposition, said pair paths undergoing juxtaposition reversals of differing periodicity from pair to pair, each such reversal occasioning a crossover of said pair paths and the distance between said crossovers along a given said pair constituting the twist length of said pair, a method for equalizing the characteristic impedance and propagation velocity for all said pairs in said cable comprising the steps of: reducing the width of each conductive path at each crossover region by a factor of substantially $\sqrt{X}$ for each reduction of a factor of X of said twist length, where the pair with the largest said twist length is taken as the reference pair.

2. The communications cable of claim 1, wherein all said pair paths are constructed with substantially the same standard width and wherein said crossover regions of all pairs but one are constructed with a path width less than said standard width by an amount dependent on the juxtaposition reversal periodicity of the given pair.

3. The communications cable of claim 1, wherein all said path pairs are constructed with substantially the same standard width and wherein said juxtaposition reversals are effected by crossover legs held at said standard width up to a point approaching the crossover and whereupon said path width is abruptly reduced to a prescribed lower value in the crossover zone.

4. A method pursuant to claim 1 comprising the further step of keeping the crossover region path width of said reference pair unchanged.

5. A method persuant to claim 4, wherein $X = 2$.

6. A flat flexible cable comprising a plurality of pairs of conductive paths held in side-by-side relation in a medium, the paths of each pair undergoing crossover points at intervals different from pair-to-pair, each pair in said cable exhibiting the same properties of characteristic impedance and propagation velocity, characterized in that: the area common to each crossover point of each path is controlled to result in the same crossover capacitance for each pair for a given long length of medium by reducing the width of each conductive path at each crossover region by a factor of substantially $\sqrt{X}$ for each reduction of a factor of $X$ of said twist length, where the pair with the largest said twist length is taken as the reference pair.

* * * * *